Schelly and Stauffer,
Mower.

No. 15669. Patented Sep. 2, 1856.

Schelly and Stauffer,
Mower.

No. 15669  Patented Sep. 2. 1856

2 Sheets. Sheet 2.

UNITED STATES PATENT OFFICE.

J. Y. SCHELLY, OF HEREFORD, AND J. STAUFFER, OF HOSENSACK, PENNSYLVANIA, ASSIGNORS TO WILLIAM WATSON, OF ST. PAUL, MINN.

IMPROVEMENT IN HARVESTING-MACHINES.

Specification forming part of Letters Patent No. 15,669, dated September 2, 1856.

*To all whom it may concern:*

Be it known that we, JOEL Y. SCHELLY, of Hereford, in the county of Berks and State of Pennsylvania, and JOSEPH STAUFFER, formerly of Upper Milford, but now residing at Hosensack, in the county of Lehigh and State aforesaid, have invented certain new and useful Improvements in the Machines for Cutting or Reaping Grain, &c.; and we do hereby declare the following to be a full, clear, and exact description of the same, reference being had to the accompanying drawings, forming part of this specification, and in which—

Figure 1:
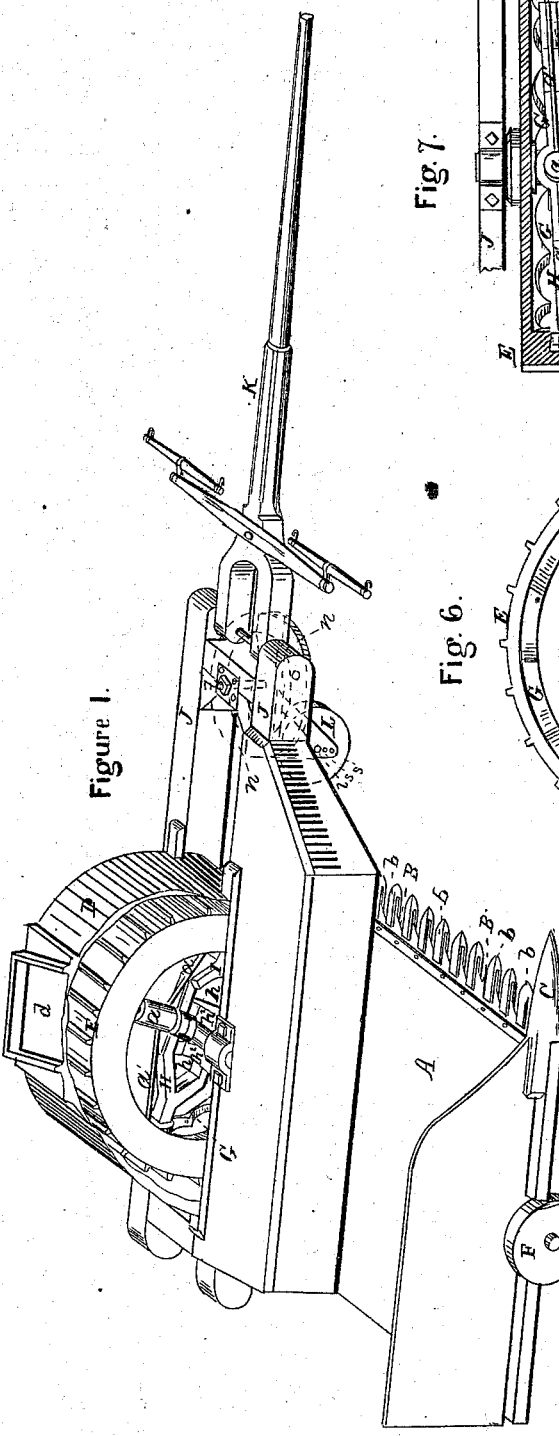
Figure 7:
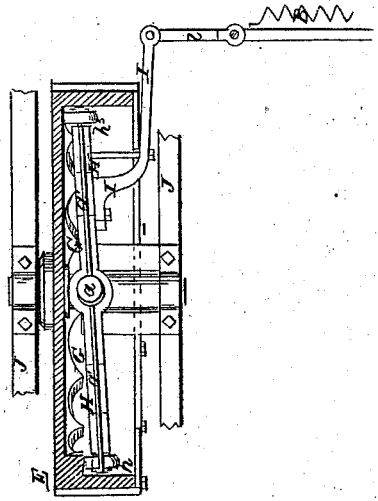
Figure 6:
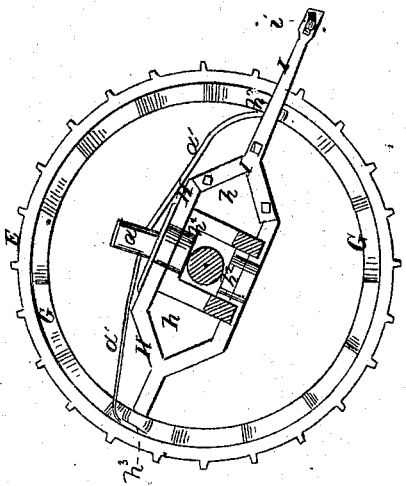
Figure 8:
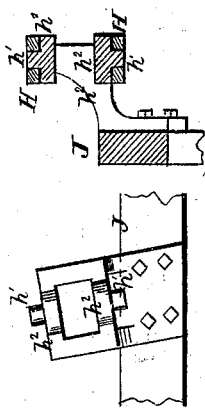
Figure 4:
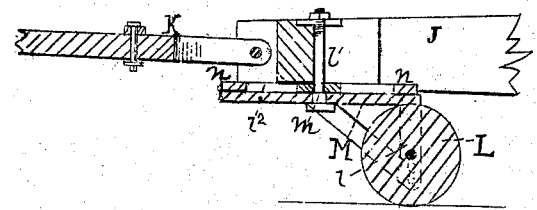
Figure 2:
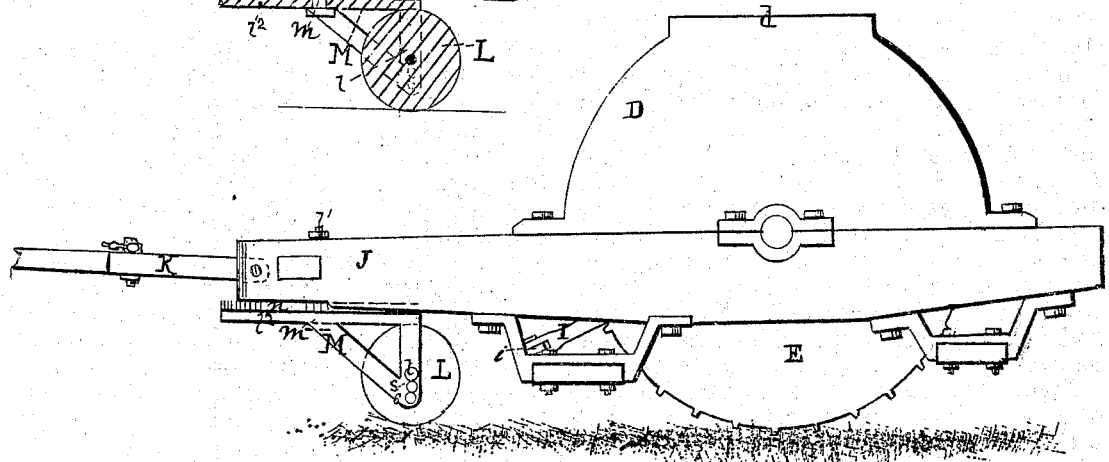
Figure 5:
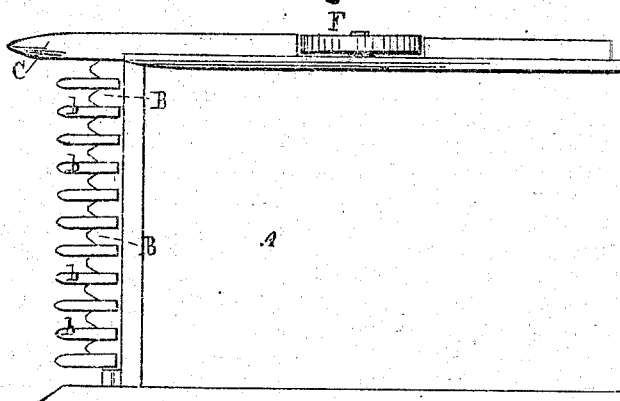
Figure 3:
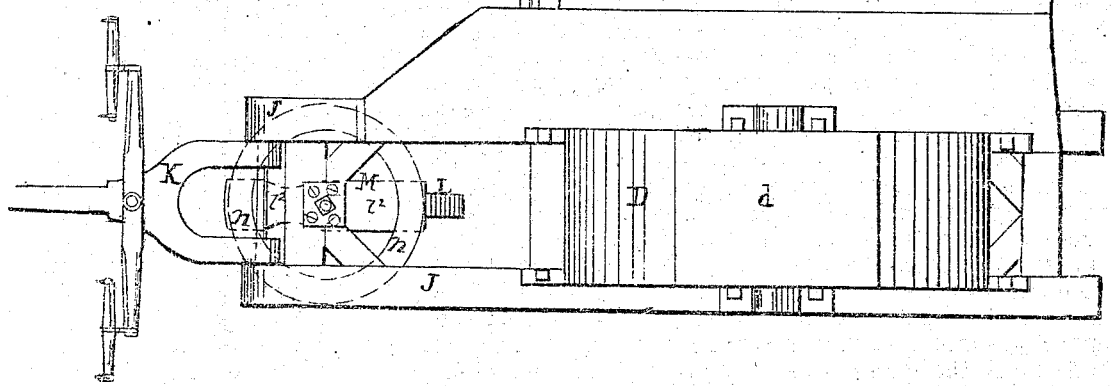

Figure 1 represents a view in perspective of a harvesting-machine embracing our invention, a portion of the casing of the driving-wheel being removed to show the mechanism for operating the cutters. Fig. 2 represents an elevation of that side of the machine most remote from the standing grain. Fig. 3 represents a top view of the machine. Fig. 4 represents a sectional view of the caster-wheel and a portion of the frame and tongue which it supports. Fig. 5 represents a perspective view of the frame which carries the caster, detached from the caster and the machine. Fig. 6 represents a vertical section through a plane parallel to the left side of the driving-wheel, the annular rim or flange of the wheel being removed to exhibit more clearly the mechanism for giving motion to the cutters. Fig. 7 represents a horizontal section of the parts shown in Fig. 6, and Fig. 8 represents a side view and a section of the bracket, and the trunnions on which the lever turns which vibrates the cutters.

The reaping and mowing machines in common use may be divided into two classes, one of which, like a cart, has an inflexible tongue or shafts, and is supported on two wheels; and the other, like a wagon, has a flexible tongue or shafts, and is supported on four wheels. Those machines which are supported on two wheels possess the advantage of compactness and cheapness; also, of being turned quickly and guided easily to avoid stumps and other obstacles on rough ground; but they have the disadvantage of loading the horses with the preponderating weight of that part of the machine which, being in front of the axle of the supporting-wheels, is upheld by the tongue or shafts which the horses support, and by which they draw. It has been attempted to remedy these defects by placing the axle of the two cart-wheels (one or both being used to drive the gearing) at or near the rear of the frame, and supporting the front part of the frame by means of a caster-wheel, which, under this arrangement, was too heavily loaded to work well, and left on the driving-wheel too little weight to produce the requisite adhesion to the ground. The machines, which are supported on four wheels, in the manner of a wagon, are more costly and cumbrous, do not turn as quickly, and are not so easily guided to avoid obstacles in rough ground; but the fore wheels support the weight of the fore part of the machine and relieve the horses from the labor of carrying it.

The object of our invention is to combine in one machine the advantages of these classes of machines, and at the same time avoid their defects.

In the accompanying drawings a reaping-machine is represented with our improvement applied thereto. This improvement, however, is equally applicable to other reaping and mowing machines of this class.

In the drawings, A is the platform; B, the cutter, which plays through a row of fingers, b, on the front edge of the platform. C is the divider. D is a case, which forms a seat, d, for the driver of the horses, and covers the driving-wheel and the mechanism for operating the sickle. E is the driving-wheel, and F the wheel which supports that end of the platform which runs next the standing grain. G, Figs. 6 and 7, is a scalloped annular cam on the side, and within the rim of the driving-wheel. H is a vibrating lever, supported on trunnions in the plane of the axis of the driving-wheel and made with an opening, $h$, in its central part, through which the axle of the driving-wheel passes. The trunnions $h'$, on which the lever H is held and vibrates, are formed on brackets $h^2$, attached to the frame of the machine, and their axes are in a plane at right angles to that in which the lever H vibrates. On or near each end of the lever, and opposite the front and rear sides of the cam, an anti-friction wheel, $h^3$, is mounted upon a suitable bearing. The office of these wheels is to run upon the scalloped surface of the cam, and thus avoid the friction that would be produced if projections of the lever, not provided with wheels, were to rub over the cam. The depressions on one side of the cam being diametrically opposite the elevations on the opposite side, it follows that when the anti-friction wheels $h^3$ on the lever are set as near to the cam as possible that on one end of the lever will be in a hollow of one of the scallops of the cam, and that on the opposite end will be on a protuberance of the cam; but by the motion of the latter the relative position of these wheels with respect to the hollows and protuberances of the cam will every moment be changing, which will communicate to the lever a vibrating motion. A bracket, I, is attached to the forward end of the lever H, and connected, through the link-rod $i$, with the sickle B, to which, of course, a vibratory motion is imparted corresponding to that which the lever H receives from the cam G on the driving-wheel. In this way the sickle is driven without gearing and with very little friction.

As the anti-friction wheels $h^3$ on the lever run with considerable velocity and sustain a very considerable but variable pressure, it is necessary that their axles should be kept well lubricated in order to prevent rapid wear. This object is accomplished by placing an oil-cup, $a$, upon the lever over the upper trunnion, and extending tubes $a'$ therefrom to the journals of the wheels, through which tubes the oil passes from the cup and drops upon the journal. The parallel beams J on either side of the driving-wheel extend forward a convenient distance, and to their front extremities the tongue K, by which the horses draw and guide the machine, is hinged. On the under side of these projecting beams the caster-wheel L is placed, as nearly in a line with the front edge of the cutter as possible. This wheel is supported on a horizontal axle, $l$, in one end of a frame, M, which frame, at the opposite end, is connected to and turns on a vertical spindle, $l'$, secured to a cross-bar, that connects the front ends of the beam J. The frame M is shown in perspective in Fig. 5, and to give greater steadiness to the wheel the top-plate, $l^2$, of the frame extends a considerable distance both ways from the bearing $m$ of the spindle $l'$, at right angles thereto, and the extremities of this plate rest against a circular planeway, $n$, affixed to the under side of the beams J. This gives a firm support to the wheel L, in whatever position it may stand, and insures its turning easily to follow the path of the horses.

As one mode of raising and lowering the cutter, provision is made for raising and lowering the axle of the wheel L by placing it higher or lower in the series of holes $s$ in the frame M. This, however, is but one of the many modes that might be adopted of raising and lowering the cutters.

It is obvious that the wheels at the right and left sides of the platform support the principal part of the weight of the machine, as they are arranged at the middle of the frame, and that the caster-wheel, which we have combined therewith, only supports that comparatively small portion of the weight of the machine by which the part in front of the axis of the two main supporting-wheels preponderates over that which is in rear thereof, together with the weight of the rear end of the tongue and a portion of the weight of the whiffletrees, &c., by which the horses draw.

It is also obvious that if the tongue or shafts were rigidly attached to and projected from the front of the machine, as is usual in the cart form of machines, of which that of Cyrus H. McCormick is an example, instead of having the tongue hinged, as under our improved arrangement, the caster-wheel would be comparatively useless, if not injurious and impracticable, because of the wide range of up-and-down motion that the front end of the tongue would necessarily have while the machine is passing over uneven ground.

Under our improved arrangement the tongue, being hinged to the machine, its front end remains at a constant height, and its duty is confined to drawing and guiding the machine, while the caster-wheel, by carrying the slightly-preponderating weight of the front of the machine, relieves the tongue and horses of this duty.

We do not claim broadly the supporting of the frame of a harvester on two main wheels, in the manner of a cart, with a caster-wheel in front of them, as the frame of the harvesting-machine patented to Edward Badlam, Jr., on the 18th day of September, 1835, is thus supported.

What we claim as our invention, and desire to secure by Letters Patent, is—

The combination of the driving-wheel G, supporting-wheel F, caster-wheel L, hinged tongue K, and the main frame, when the said parts are arranged and operate in relation to each other in the manner herein set forth.

In testimony whereof we have hereunto subscribed our names.
JOEL Y. SCHELLY.
JOSEPH STAUFFER.

In presence of—
F. G. FONTAINE,
SAMUEL STAUFFER.